Patented Dec. 3, 1935

2,022,890

UNITED STATES PATENT OFFICE 2,022,890

MAGGOT EXTRACT AND PROCESS OF OBTAINING IT

Stanton Knowlton Livingston, Maywood, Ill.

No Drawing. Application November 15, 1933, Serial No. 698,149

5 Claims. (Cl. 167—74)

It is the object of my invention to produce a therapeutically effective extract from maggots, and especially one which among other things is effective in combating infection and in promoting healing of various tissues.

It has been known for several centuries that when certain wounds became infested with live maggots, healing of the wound was facilitated. Probably the first to note this was Ambrose Paré, in France, about 1590. Further observations were made by Dominique Jean Larrey, Napoleon's famous surgeon, in the early nineteenth century; and Joseph Francois Malgaigne, also in France, did some definite experimental work with maggots in cases of compound fractures, both in rats and in human beings, about the middle of the nineteenth century. During the War between the States, Dr. W. W. Keen noted the beneficial effects of maggots in wounds of soldiers. Dr. W. S. Baer, of Johns Hopkins University, made a very extensive study of the beneficial effects of maggots in wounds of soldiers during the World War; and after the World War he used maggots deliberately and with great success in osteomyelitis, to promote healing.

So far as I am aware, however, all work previous to mine has been with the living maggots, directly infesting the diseased part. This involved many unpleasant features, mental and physical, including considerable actual pain from the voracity of the maggots. The motility of the maggots, moreover, has made it impossible to use them in many areas, as for instance in the scalp, jaw, sinus, middle ear, rectum, etc.

I have discovered that an effective extract may be made from maggots, with substantially all the beneficial effects of the living maggots, and with a capability of use not only where the living maggots have been used but in places where the living maggots can not be used; and have produced such an extract. This extract has many other advantages, not the least of which is the avoidance of the mental reactions from the use of living maggots and of the actual pain caused by their action in wounds.

This extract has a capability of use which as yet has been but partially determined. It has already been found useful in many types of injuries and infections, including:

1. Osteomyelitis, in any bone.
2. Active infection, of various types, such for example as:
   a. In the genito-urinary tract;
   b. In the skin, such as carbuncles and furuncles;
   c. In the peritoneum.
3. Indolent ulcers, of various types.
4. Fistulous tracts, especially in and about the rectum.
5. Skin grafts.
6. Burns, including irradiation ulcerations, as from ultra-violet light, X-rays, radium, and radon.
7. Gangrene, in all stages.

It has also been found useful as a vehicle for vaccines, both autogenous and stock, and other bacteriological preparations; for certain desirable synergistic effects are noted in such uses. In addition the maggot extract has certain bacteriostatic properties.

I may prepare my extract of maggots by various procedures. A preferred procedure is as follows:

The maggots used are desirably bacteriologically sterile. Sterile maggots may be grown in various ways, some of which have been described in the literature and which are not part of my present invention. But while sterile maggots are desirable, they are not essential to my invention, because of the sterilization obtained in my process.

I prefer to use maggots which have been produced from stock of known genera and species grown for at least several generations under controlled conditions; and desirably to use large maggots, which can be so produced. I have found the *Calliphora erythrocephala* and the *Lucilia sericata* convenient species. But my invention is not limited to maggots of these types.

The maggots, desirably about four days old, are thoroughly ground and pulpified, in any convenient manner. The pulpified maggots are extracted with a suitable solvent which takes up the active principle. A desirable solvent is a salt solution, preferably a physiological salt solution; but various solvents, desirably approximating isotonicity such for instance as Locke's solution or Ringer's solution, may be used. The volume of the extracting solvent may vary; and I have obtained effective extracts in which the volume of pulpified maggots extracted is from 1% to 25% of the total volume of maggots and solvent. I refer to the extracts as the 5% extract, the 10% extract, etc., to indicate the volume used of pulpified maggots in terms of the total volume during extraction.

The extracting saline solution is allowed to stand on the pulpified maggots for several hours; preferably in the cold, or from about 2° to 5° C. The hydrogen ion concentration is desirably kept slightly on the alkaline side of neutrality, or at about pH 7.5. Agitation facilitates the extraction.

After several hours standing, the suspension is filtered through coarse soft filter paper; which removes the pulpified maggot material therefrom, and gives a fairly clear filtrate which contains the active material. If necessary, a little acid or alkali is now added, to maintain about pH 7.5.

The filtrate obtained from the paper filtration is then filtered through a Berkefeld or Chamberland or other sterilizing filter, to obtain bacteriological sterility. The filtrate so obtained is suitably tested for sterility. Usually it is found sterile; but if not, it is re-filtered through a suitable sterilizing filter, and again tested for sterility.

The sterile filtrate may be used without preservatives, especially if it is used promptly. But for prevention of contamination, especially if the extract is not to be used immediately, and although the extract itself has some bacteriostatic properties, I preferably add a suitable preservative, such as phenol or tri-cresol or merthiolate in appropriate concentration.

The sterile extract may be applied locally, at the site of the injury to be treated, with considerable advantage over the live maggots for reasons already given. The extract, of course, must be suitably held in place, as by being in a wet dressing. But it is not limited to local application; for the sterile extract is found advantageous by general and/or local hypodermic administration, in suitable concentration, to promote within the body of the patient a condition which tends to facilitate healing. For such administration I usually refer subcutaneous or intromuscular injection rather than intravenous injection.

My maggot extract, in suitable concentration, may also be used with advantage as the vehicle in which killed organisms or bacteria, as of the streptococcus, staphylococcus, pneumococcus, B. coli, etc., are suspended to form vaccines. I prefer that in such vaccines made with my maggot extract as the vehicle a suitable preservative be added, such as phenol, tri-cresol, or merthiolate.

My maggot extract has the following properties:

1. As preferably produced, it has a hydrogen ion concentration in the neighborhood of pH 7.3 to pH 7.7.

2. If it is heated to 60° C. for one hour a coagulum or precipitate forms. The amount of this coagulum varies, but is of the general order of 300 to 600 mgs. per 100 cc. of the extract for extracts of from 3% to 10%.

3. The maggot extract or the heat-coagulated precipitate obtained by heating it will immunize a guinea pig; and the serum of the guinea pig so immunized will produce a specific precipitin reaction if added to the maggot extract. The supernatant liquid after the heat coagulation will not so immunize a guinea pig.

I claim as my invention:

1. The process of obtaining an extract of maggots, which consists in extracting maggots with a substantially physiological salt solution, and separating the extract from the residue.

2. The process of obtaining an extract of maggots, which consists in extracting maggots with a substantially isotonic solution, and separating the extract from the residue.

3. The process of obtaining an extract of maggots, which consists in extracting maggots with a substantially physiological salt solution at a hydrogen ion concentration slightly on the alkaline side of pH 7, and separating the extract from the residue.

4. The process of obtaining an extract of maggots, which consists in extracting maggots with a substantially isotonic solution, separating the extract from the residue, and passing the extract through a sterilizing filter.

5. A sterile extract of maggots, which is effective in promoting healing, and which when subjected to a temperature of 60° C. for an hour yields a coagulum capable of immunizing a guinea pig so that the guinea-pig's serum produces a specific precipitin reaction with the original maggot extract.

STANTON KNOWLTON LIVINGSTON.

CERTIFICATE OF CORRECTION.

Patent No. 2,022,890.   December 3, 1935.

STANTON KNOWLTON LIVINGSTON.

It is hereby certified that error appears in the printed specification of the above numbered patent requiring correction as follows: Page 2, first column, line 27, for "refer" read prefer; and line 27-28, for "intromuscular" read intramuscular; and that the said Letters Patent should be read with these corrections therein that the same may conform to the record of the case in the Patent Office.

Signed and sealed this 28th day of January, A. D. 1936.

Leslie Frazer
Acting Commissioner of Patents.

(Seal)